United States Patent [19]
Jackson et al.

[11] Patent Number: 5,489,448
[45] Date of Patent: Feb. 6, 1996

[54] WATER REDUCIBLE POLYESTER AND RESIN COMPOSITION FOR A FLEXIBLE PLASTIC PRIMER

[75] Inventors: Michael L. Jackson, LaGrange, Ill.; Frank A. Stubbs, Schererville, Ind.; Joseph M. Mecozzi, Hammond, Ind.; Dean T. Smith, Crown Point, Ind.

[73] Assignee: Bee Chemical Company, Lansing, Ill.

[21] Appl. No.: 280,684

[22] Filed: Jul. 26, 1994

Related U.S. Application Data

[63] Continuation of Ser. No. 67,364, May 26, 1993.

[51] Int. Cl.$^6$ ........................................ B05D 1/02
[52] U.S. Cl. .................... 427/421; 528/272; 525/398; 525/400; 525/437; 525/441; 525/472; 524/81; 524/601; 524/602; 524/604; 524/608; 427/207.1
[58] Field of Search ............................ 528/272; 525/437, 525/441, 472, 398, 400; 427/207.1, 421; 524/81, 601, 602, 604, 608

[56] References Cited

U.S. PATENT DOCUMENTS

| | | | |
|---|---|---|---|
| 3,864,300 | 2/1975 | Robey | 523/102 |
| 4,014,708 | 3/1977 | Kaiser et al. | 106/287 |
| 4,071,578 | 1/1978 | Lasher | 525/158 |
| 4,426,478 | 1/1984 | Noyes et al. | 524/361 |
| 4,514,230 | 4/1985 | Passmore et al. | 106/243 |
| 4,581,093 | 4/1986 | Noyes et al. | 156/307.3 |
| 4,714,657 | 12/1987 | Quinn et al. | 428/412 |

*Primary Examiner*—Samuel A. Acquah
*Attorney, Agent, or Firm*—Robert M. Didrick; Gerald K. White

[57] ABSTRACT

A water-free, water-free reducible primer composition having a volatile organic content of less than 3 pounds per gallon yields a tough, flexible, and weatherable film when applied to metal or plastic substrates. The base resin is a polyester having an acid number of from about 50 to about 60 and a hydroxyl number of from about 160 to about 200. The polyester is the reaction product of from about 0.45 to about 0.5 mole % of adipic acid, from about 0.35 to about 0.4 mole % of neopentyl glycol, and from about 0.15 to about 0.2 mole % of trimethylolpropane.

12 Claims, No Drawings

WATER REDUCIBLE POLYESTER AND RESIN COMPOSITION FOR A FLEXIBLE PLASTIC PRIMER

This is a continuation of co-pending application Ser. No. 08/067,364 filed on May 26, 1993.

FIELD OF THE INVENTION

This invention relates to a water reducible polyester and to a water-free, water reducible coating composition comprising it which provides a flexible, weatherable primer. It relates more particularly to a coating composition which has a significantly lower volatile organic content (VOC) than those which are currently available commercially. It relates also to a method for applying a water-reducible primer composition as a water-reduced composition having a spraying viscosity.

BACKGROUND OF THE INVENTION

Environmental concerns during the past decade and more have caused many governing bodies to issue regulations limiting the VOC of coating compositions. In response to these regulations, the coating industry has turned to powder coating formulations which contain essentially no volatile organic compounds and to water-based coating compositions. Because of the corrosive nature of water-based compositions, they must be shipped in plastic containers or in specially coated steel containers. Special equipment such as stainless steel tanks, lines, and spraying apparatus must also be used. The typical commercially available solvent-borne coating compositions have a VOC of about 5.0 pounds or more per gallon. While it would be desirable to lower the VOC of such compositions for environmental reasons, the practical difficulty is that the viscosity would be generally too high for easy applicability to a chosen substrate.

Modern automobiles use significant and increasing amounts of plastic and elastomeric components and thus the demand for coatings having a high degree of elasticity, toughness, and weatherability has been increasing steadily. Poly (ester-urethane) polyol resins when cured with an aminoplast provide suitable elastomeric coatings but these are expensive. Polyester resin compositions may also be cured with an aminoplast to yield coatings but their elasticity and weatherability generally have not been satisfactory. The formulation of polyester resin coating compositions having the demanded properties is made significantly more difficult when the polyester must also have properties which allow it to be shipped and pumped in a water-free state but readily reducible with water to a sprayable viscosity at the point of use.

SUMMARY OF THE INVENTION

It is an object of this invention, then, to provide a polyester having a sufficiently large hydrophilic functionality to make it water reducible but still capable of imparting flexibility and weatherability to coating compositions based thereon.

It is a related object of this invention to provide a polyester resin capable of having its viscosity reduced with a minimal amount of volatile organic solvent to a value such that it may be pumped easily into and out of shipping containers.

It is another related object of this invention to provide a solvent-borne primer composition having a VOC of less than 3.0 pounds per gallon which is water reducible to a coating composition which yields a tough, flexible, weatherable film.

It is still another object of this invention to provide a method for spraying a water-reduced composition generated at the spray head from water and a solvent-borne, water-reducible primer composition having a volatile organic content of less than 3.0 pounds per gallon.

DETAILED DESCRIPTION OF THE PREFERRED EMBODIMENTS

These and other objects of this invention which will be apparent from the following description are achieved by preparing a polyester having an acid number of from about 50 to about 60 which is the reaction product of from about 0.45 to about 0.5 mole % of adipic acid, from about 0.35 to about 0.4 mole % of neopentyl glycol, and from about 0.15 to about 0.2 mole % of trimethylolpropane; adding an aminoplast curing agent; a blocked curing catalyst; and from about 27 to about 33% of an organic solvent, based on the total weight of the water reducible primer composition, while maintaining said composition in a substantially water-free condition, and then simultaneously introducing the water reducible primer composition and water into a spray head in proportions sufficient to form a sprayable water reduced coating composition in the spray head.

For the purposes of this invention, the term substantially water-free shall mean that the water content was held to about 3% or less by weight of the water reducible primer composition. This water is incidental to the use of concentrated ammonium hydroxide as an aid to the water reducibility of the acidic polyester.

The polyester resins of this invention have a hydroxyl number of from about 160 to about 200, preferably from about 175 to about 185. The hydroxy functionality of the resin is about 2.3/molecule and the carboxy functionality is about 0.7/molecule. The Brookfield viscosity of the resin, using a #6 spindle at 100 rpm, is from about 12,500 to about 25,200 centipoises. Its density is about 1.1 to about 1.14 grams/cc (from about 9.13 to about 9.53 pounds per gallon). The theoretical molecular weight of a preferred resin is 717.

The special suitability of the polyester resins of this invention for the use described herein is due to the selection of the starting materials on which the polyesters are based, the quantitative proportions in which they are used, and the extent of the esterification reaction. An acid value within the range recited above is necessary for the desired water reducibility and flexibility of the resin. A resin having an acid value substantially below 50 will not be reducible and one having a value substantially above 60 will reduce the hardness and potentially increase the hydrophilicity to a point that is not acceptable for the primer coating of this invention.

Preparation of the polyester resin may be carried out by methods which are well known by and routinely practiced by those of ordinary skill in the art. The reactants may be heated to a temperature in the range of from about 135° to 220° C. (about 275° to 430° F.) while being sparged with a stream of inert gas such as nitrogen to remove water as it forms. An azeotrope-forming solvent may be used at the appropriate temperature. The use of vacuum to assist the removal of water must take into account the potential loss of neopentyl glycol through sublimation. A catalyst may be used but satisfactory results are achieved without one.

The polyester resin is soluble in water-miscible organic solvents which are exemplified by propylene glycol monopropylether (also known as propyl propasol), butyl cellosolve, butyl carbitol, and N-methylpyrrolidone. Said solvents are used to help blend the water reducible resin with water at the point of use. The solvent-borne, water reducible primer compositions of this invention are made by dissolving the resin, curing agent, catalyst, and various additives in said solvents. The primer compositions preferably contain about 30% of the organic solvent. A particularly preferred primer composition contains about 2.8 pounds of volatile organic compounds (essentially all of which are solvents) per gallon, which is about 30% by weight of the total composition.

When the polyester resins are used for the purposes of this invention (i.e., as the binder for a primer composition), an aminoplast is preferably used as the curing agent. Aminoplasts are the reaction products of aldehydes, particularly formaldehyde, with amino- or amido-group-carrying substances exemplified by melamine, urea, dicyanodiamide, and benzoguanamine. Aminoplasts which are modified with alkanols having from one to four carbon atoms are advantageous. An especially preferred curing agent is hexamethoxymethyl melamine (HMMM). The amine-aldehyde materials function as a crosslinking agent in the composition by reacting with the hydroxyl functionality of the polyester. In order to achieve the outstanding properties which make these coatings particularly useful, it is essential that the amount of crosslinking agent be sufficient to substantially completely react with the hydroxyl functionality present. Therefore, the amount of crosslinking agent should be sufficient to provide from about 1 to about 3 equivalents of nitrogen crosslinking functionality for each equivalent of hydroxyl functionality in the polyester.

A blocked catalyst is inactive in the solvent-borne, water reducible primer composition until the curing action of the aminoplast is initiated during baking of the coated substrate. Examples of such a blocked catalyst include volatile amine-blocked sulfonic acids such as are available from King Industries under the Nacure trademark and which may be exemplified further as Nacure 2500K, Nacure X-49-110, Nacure 5225, and Nacure 2558.

The solvent-borne, water reducible primer composition may be applied by the usual methods such as dipping, roller coating, and the like but it is highly preferable to spray the composition from a compressed air spray gun. Another advantage of this invention is that the solvent-borne composition may be reduced with water in the spray gun head as it is being applied to the substrate. Plural component spray equipment such as is available from both Binks and Graco may be used to gain that advantage. The reduction ratio of solvent-borne primer composition to water may be from about 4:1 to about 2:1 by weight, but a preferred reduction ratio is about 3:1.

The following substrates may be coated with the water reduced primer composition of this invention: RIM (reaction injected urethane moldings), adhesion promoted thermoplastic polyolefin, E-coat steel, G.E. GTX 910 and 917 polyphenylene oxide/nylon 6 plastic, Dow Pulse B-250 thermoplastic resin, DuPont Minlon 12T nylon, DuPont Bexloy V-978 thermoplastic resin, and the like. Curing of the water reduced primer coating suitably is performed in two steps—a flash step at ambient temperature for 10 minutes followed by a 30 minute bake at 250° F. The dry film thickness of the primer according to this invention is from 1.2 to 1.5 mils when no topcoat is to be applied but it may be reduced to about 0.8 to 1.0 mil when there is to be a topcoat.

When the substrate is a plastic, the solvent-borne primer composition suitably contains conductive pigments to facilitate the electrostatic spraying of the primer and subsequent coatings thereon, but other, non-conductive, pigments are also contemplated for use when the substrate is a metal or another application method is desired. Adhesion of the primer to the substrate and adhesion of a topcoat to the primer are both excellent. The weatherability of the primer film is good as shown by ASTM 2247 test results wherein the primed substrate is subjected to 100% relative humidity at 100° F. for 240 hours or more and by exposure of primed panels in Florida for 12 months.

Other functional additives such as UV absorbers, thixotropic agents, flatteners, and wetting agents may also be used to make up the solvent-borne, water reducible primer composition of this invention. Ammonium hydroxide is used in small quantities to aid in the water reduction of the water reducible primer.

The invention is further illustrated but not limited by the following examples in which all parts are parts by weight unless otherwise indicated.

EXAMPLE 1

Twenty-four hundred and ninety-six parts (18.49 moles) of trimethylolpropane, 8100 parts (55.48 moles) of adipic acid, and 4893 parts (42.35 moles) of 90% neopentyl glycol (10% moisture) were heated to 420° F. (216° C.) and mixed in a reactor equipped with a condenser and a water trap while a stream of nitrogen gas was passed through the liquid mixture until the acid value was 52.5. At this point, 2089 parts of water (including the moisture from the neopentyl glycol) had been collected and measured.

EXAMPLE 2

Step 1. The following components were sand milled in the following proportions to make a dispersion of a conductive black pigment:

|  | Parts |
|---|---|
| Water Reducible Polyester made by the general procedure of Example 1 (WRP) | 35.50 |
| Butyl Carbitol | 14.39 |
| Butyl Cellosolve | 28.79 |
| Propyl Propasol | 15.32 |
| Conductive Black Pigment | 6.00. |
|  | 100.00 |

Step 2. The following components were sand milled in the following proportions to make a thixotrope dispersion:

| Propyl Propasol | 72.50 |
|---|---|
| WRP | 20.00 |
| Thixotrope (Aerosil 380) | 7.50 |
|  | 100.00 |

Step 3. A solvent-borne, water reducible primer composition was made from the following components in the following proportions:

| Propyl Propasol | 1.91 |
|---|---|
| WRP | 24.18 |
| HMMM (Cymel 303) | 18.14 |
| UV absorber | 0.63 |
| Conductive Dispersion | 32.44 |
| Thixotrope Dispersion | 9.74 |
| Flattener | 5.50 |

| | |
|---|---:|
| Blocked Catalyst (Nacure 2558) | 2.90 |
| Ammonium hydroxide (28%) | 4.06 |
| Wetting agent | 0.50 |
| | 100.00 |

EXAMPLE 3

The water reducible primer composition of Example 2 was thinned with water at a 3:1 weight ratio and the water reduced primer composition was sprayed with a Binks Model 62 siphon-fed spray gun at 60 psi onto a series of plastic substrates used in automobiles in sufficient thickness to give a 1.0–1.2 mil thick dry film after a flash dry for 10 minutes at ambient temperature and a 30 minute bake at 250° F.

The primed substrates were tested according to the GM4367M specification of General Motors Corporation. One portion of the primed substrates was given a white topcoat, another a blue topcoat, and third was not topcoated. Sample panels of each of the coated substrates were exposed to the Florida sun and rain for 12 months. Slight dulling of the panels having no topcoat was observed at the conclusion of the exposure but the gloss could be restored with waxing. The white and the blue panels underwent a slight color change and gloss loss but this could be restored with waxing. The adhesion of the primer to the substrate, the moisture resistance of the primer with and without a topcoat, the chip resistance of the coated panels, and the flexibility of the primer on the Florida-exposed panels were then tested according to the procedures described in the GM4367M specification. The test results are given in the following table:

2. The polyester of claim 1 wherein the mole percentages of the adipic acid, neopentyl glycol, and trimethylopropane are 0.48, 0.36, and 0.16, respectively.

3. A water-free, water-reducible, flexible, exterior primer composition consisting essentially of a water-reducible polyester having an acid number of from about 50 to about 60 and a hydroxyl number of from about 160 to about 200 which is the reaction product of from about 0.45 to about 0.5 mole % of adipic acid, from about 0.35 to about 0.4 mole % of neopentyl glycol, and from about 0.15 to about 0.2 mole % of trimethylolpropane; an aminoplast curing agent, and a water-soluble organic solvent.

4. The primer composition of claim 3 wherein the solvent is from about 27 to about 33% of the total weight.

5. The primer composition of claim 3 wherein the mole percentages of the adipic acid, neopentyl glycol, and trimethylopropane are 0.48, 0.36, and 0.16, respectively.

6. The primer composition of claim 3 wherein the solvent is 30% of the total weight.

7. A method for applying a primer to a substrate comprising simultaneously introducing water and a water-free, water-reducible, flexible, exterior primer composition consisting essentially of a water-reducible polyester having an acid number of from about 50 to about 60 and a hydroxyl number of from about 160 to about 200 which is the reaction product of from about 0.45 to about 0.5 mole % of adipic acid, from about 0.35 to about 0.4 mole % of neopentyl glycol, and from about 0.15 to about 0.2 mole % of trimethylolpropane; an aminoplast curing agent, and a water-soluble organic solvent into a spray gun head and spraying the water-reduced primer onto the substrate.

8. The method of claim 7 wherein the organic solvent is from about 27 to about 33% of the total weight of the primer composition.

| Substrate | C.H. Tape Adhesion | | | X-scribe Tape Adhesion | | | Moisture Resistance | | | Chip Resistance | | | Flexibility | | |
|---|---|---|---|---|---|---|---|---|---|---|---|---|---|---|---|
| | P | W | B | P | W | B | P | W | B | P | W | B | P | W | B |
| Nylon | Pass | Pass | Pass | Pass | Pass | Pass | Pass | Pass | Pass | 8 | 8+ | 8+ | | | |
| Nylon GTX 917 | Pass | Pass | Pass | Pass | Pass | Pass | Pass | Pass | Pass | 5 | 8 | 8 | | | |
| Minlon 12T-NC010 | Pass | Pass | Pass | Pass | Pass | Pass | Pass | Pass | Pass | 8B | 8 | 7B | | | |
| Bexloy V978 | Pass | Pass | Pass | Pass | Pass | Pass | Pass | Pass | Pass | 8B | 8 | 7B | | | |
| Mobay 110-25 IMR, 15% MGF | Pass | Pass | Pass | Pass | Pass | Pass | Pass | Pass | Pass | No Chips | No Chips | No Chips | Pass | Pass | Pass |
| Pulse B250 | Pass | Pass | Pass | Pass | Pass | Pass | Pass | Pass | Pass | 8B | 8B | 8B | | | |
| ETA 3041C (TPO) N/N | Pass | Pass | Pass | Pass | Pass | Pass | Pass | Pass | Pass | Exceeds 8B | Exceeds 8B | Exceeds 8B | Pass | Pass | Pass |

C.H. = cross hatch
X-scribe = cross cut X-scribe
P = primer
W = white topcoat
B = blue topcoat Although the invention has been described in detail for the purpose of illustration, it will be understood that variations can be made without departing from the spirit and scope of the invention.

The subject matter claimed is:

1. A water-reducible polyester having an acid number of from about 50 to about 60 and a hydroxyl number of from about 160 to about 200 which consists essentially of the reaction product of from about 0.45 to about 0.5 mole % of adipic acid, from about 0.35 to about 0.4 mole % of neopentyl glycol, and from about 0.15 to about 0.2 mole % of trimethylolpropane.

9. The method of claim 8 wherein the solvent is about 30% of the total weight of the composition.

10. The polyester of claim 1 further characterized by a Brookfield viscosity of from about 12,500 to about 25,200 centipoises at 100 rpm using a #6 spindle.

11. The composition of claim 3 wherein the polyester has a Brookfield viscosity of from about 12,500 to about 25,200 centipoises at 100 rpm using a #6 spindle.

12. The method of claim 7 wherein the polyester has a Brookfield viscosity of from about 12,500 to about 25,200 centipoises at 100 rpm using a #6 spindle.

* * * * *